United States Patent
Sjodin et al.

(10) Patent No.: US 7,285,151 B2
(45) Date of Patent: Oct. 23, 2007

(54) MATERIAL FOR COATING AND PRODUCT COATED WITH THE MATERIAL

(75) Inventors: Per Erik Sjodin, Lund (SE); Per Olof Gunnar Dahlberg, Lund (SE)

(73) Assignee: Alfa Laval Corpoarate AB, Tumba (SE)

( * ) Notice: Subject to any disclaimer, the term of this patent is extended or adjusted under 35 U.S.C. 154(b) by 115 days.

(21) Appl. No.: 10/477,020

(22) PCT Filed: May 6, 2002

(86) PCT No.: PCT/SE02/00885

§ 371 (c)(1),
(2), (4) Date: Apr. 27, 2004

(87) PCT Pub. No.: WO02/090038

PCT Pub. Date: Nov. 14, 2002

(65) Prior Publication Data

US 2005/0072268 A1  Apr. 7, 2005

(30) Foreign Application Priority Data

May 7, 2001  (SE) .................................. 0101602

(51) Int. Cl.
*F22F 1/00*   (2006.01)
*B22F 9/04*   (2006.01)
*B22F 9/08*   (2006.01)

(52) U.S. Cl. ....................................................... 75/252
(58) Field of Classification Search ................... 75/252
See application file for complete search history.

(56) References Cited

U.S. PATENT DOCUMENTS

| 3,129,095 | A | * | 4/1964 | Luce et al. .................... 420/15 |
| 3,725,016 | A | * | 4/1973 | Mal et al. ..................... 428/545 |
| 3,741,791 | A | * | 6/1973 | Maxwell et al. ............ 427/250 |
| 4,516,716 | A |   | 5/1985 | Coad |

FOREIGN PATENT DOCUMENTS

| EP | 0 757 111 A1 | 2/1997 |
| EP | 0 804 993 A1 | 11/1997 |

\* cited by examiner

*Primary Examiner*—Roy King
*Assistant Examiner*—Ngoclan T. Mai
(74) *Attorney, Agent, or Firm*—Michaud-Duffy Group LLP

(57) ABSTRACT

The invention relates to an iron based material for coating of surfaces which comprises a binding phase in the form of a corrosion dense alloy which contains at least 50% Fe, 12-30% Cr, maximally 5% Mn, 0-40% Ni, preferably 6-20% Ni and 0-7% Mo and 0-1% N and 6-20% Si, all stated as weight percent, which addition of Si lowers the liquidus temperature, that is the temperature at which the binding phase is completely melted. The invention also aims at products of metal coated with the iron based material mentioned above.

13 Claims, No Drawings

MATERIAL FOR COATING AND PRODUCT COATED WITH THE MATERIAL

CROSS-REFERENCE TO RELATED APPLICATIONS

This application is entitled to the benefit of and incorporates by reference essential subject matter disclosed in International Application No. PCT/SE02/00885 filed on May 6, 2002 and Swedish Patent Application No. 0101602-1 filed on May 7, 2001.

FIELD OF THE INVENTION

The present invention relates to an iron based material for coating of surfaces and products coated with the material.

BACKGROUND OF THE INVENTION

It is known earlier to make surfaces more wear resistant and corrosion resistant by coating them with an abrasion resistant material. Such hard metal coatings usually consist of Ni- and Co-alloys, which form a softer binding phase and in addition contain hard particles such as oxides, carbides, borides and nitrides. The hard particles may either be mixed with the binding phase or oxygen, carbon, nitrogen and/or boron are added in such amounts that these form oxides, carbides, nitrides and/or borides. The abrasion resistant material is usually applied to the surface that should be treated in the form of a powder. The powder is applied to the surface and the binding phase is melted. Alternatively the material may already be melted when it is applied to the surface.

Coating material with a binding phase consisting of a Ni- or a Co-alloy may cause problems in that the coated surface in many instances is more noble than the parent metal which may give rise to galvanic corrosion. These coating materials are also relatively expensive.

Today there are also coatings of stainless steel for certain applications. The surfaces which shall be protected are coated with stainless steel, either by thermal spraying or by welding the stainless steel. There are certain drawbacks. If the stairdess steel is added by thermal spraying there is no tight layer. If the stainless steel is welded, the material which is to be coated melts.

SUMMARY OF THE INVENTION

The present invention relates to a new material for coating surfaces, which material is proportionately inexpensive but offers the same possibility to obtain a tight layer which is well attached to the surface of the object which is coated as Ni- or Co-alloys. The coating material is based on a corrosion dense material (stainless steel). According to the invention the material comprises a binding phase of a corrosion dense alloy which contains at least 50% Fe, 12-30% Cr, maximally 5% Mn, 040% Ni, preferably 6-20% Ni, 0-7% Mo and 0-1% N and 6-20% Si, all stated as weight percent. The addition of Si lowers the liquidus temperature, that is the temperature at which the binding phase is melted completely to a value below 1250° C., preferably below 1200° C. The coating material contains apart from iron and chromium, manganese and silicon in the amount given above.

The coating material may contain hard particles based on oxides, nitrides, carbides and/or mixtures of these. Alternatively one may add oxygen, carbon, nitrogen and/or boron in such amounts that these elements form oxides, carbides, nitrides and/or borides.

The expression "iron based material" refers henceforth to the binding phase including the hard particles. By coating a surface with an iron based material according to the invention one may obtain a corrosion dense surface layer on a surface that is not in itself corrosion resistant. One may also obtain a wear resistant surface on an object manufactured from a less wear resistant material. By a local coating of the iron based material one may, if so is desired, obtain a coating in certain points.

DETAILED DESCRIPTION OF THE PREFERRED EMBODIMENTS

The iron based material contains apart from Si, B and/or P and/or Hf and/or C in the binding phase, which elements also lower the liquidus temperature. The amount of B is 0-1,5%, while the amount of P is 0-15%, the amount of Hf is 0-15% and the amount of C is 0-2%.

The amount of Si which is found in the binding phase is 7-16%, preferably 8-12%. The active, dissolved amount of Si ought to lie in this interval in order to obtain the desired melting point lowering effect. The analyzed amount of Si may be considerably higher, since Si may occur in the form of silicon carbides or silicon nitrides, be bound to oxygen or have been sintered in some other way.

The binding phase in the iron based coating material may if so is desired contain alloying elements such as Ti, W, Al, Cu, Nb, Ta, V and others. Variations in composition may also be a consequence of small inevitable amounts of contaminating elements such as C, 0, N and S.

The binding phase in the iron based coating materials produced by gas or water atomization of a melt with the composition given above. Alternatively the binding phase may be produced by melt spinning or crushing of an ingot with the composition as stated above.

The invention also includes products of metal coated with the iron based material of the kind described above.

The iron based material according to the invention may be applied to the surface, which shall be coated in manners known for other kinds of coatings by bringing the binding phase in the material to the melting point. The iron based material is applied on the surface of the object which shall be coated, after which the object is heated in a furnace to a temperature where the binding phase of the material melts. The iron based coating material may also be applied to the surface by thermal spraying. The iron based materiel may also be applied to the surface in the shape of a powder, after which the binding phase is brought to melt by means of a laser.

In the table below there are shown examples of the composition of the binding phase in different coating materials, which are produced by melting in a small vacuum furnace. The ingot thereafter solidified in the chill mould.

TABLE 1

Analysis of some experiment melts

| Melt | Fe | % Si | % Mn | % P | % B | % Cr | % Mo | % Ni |
|---|---|---|---|---|---|---|---|---|
| 1 | Bal | 6 | 1 | 0 | 0 | 17 | 2.5 | 12 |
| 2 | Bal | 8 | 1 | 0 | 0 | 17 | 2.5 | 12 |
| 3 | Bal | 10 | 1 | 0 | 0 | 17 | 2.5 | 12 |
| 4 | Bal | 12 | 1 | 0 | 0 | 17 | 2.5 | 12 |
| 5 | Bal | 15 | 1 | 0 | 0 | 17 | 2.5 | 12 |
| 6 | Bal | 6 | 1 | 0 | 1.5 | 17 | 2.5 | 12 |
| 7 | Bal | 6 | 1 | 3 | 0 | 17 | 2.5 | 12 |
| 8 | Bal | 10 | 1.5 | | | 17 | 2.5 | 20 |

TABLE 1-continued

Analysis of some experiment melts

| Melt | Fe  | % Si | % Mn | % P  | % B | % Cr | % Mo | % Ni |
|------|-----|------|------|------|-----|------|------|------|
| 9    | Bal | 0    | 1    | 10.5 | 0   | 17   | 2.5  | 12   |
| 10   | Bal | 4    | 1    | 6    | 0   | 17   | 2.5  | 12   |

The expression Bal means that the remaining part of the material in the melt consists of Fe.

An iron based material of the kind that is proposed according to the invention is more advantageous from a cost viewpoint than the Ni- and Co-coatings that are found on the market today.

The now proposed coating material may be used for equipment within the food and pharmaceutical industry, where Ni-alloys are not allowed for coating of surfaces intended to be used in food connections.

The coating material may also find use for different kinds of surfaces which are subjected to hard wear as for example the screw/conveyor in a decanter centrifuge or other kinds of equipment which demand wear resistant surfaces or for example in grinding tools.

By coating the surface of, apparatuses which are used in a corrosive environment such as in the chemical industry or in salt water, as for example valves with the material according to the invention one may increase the corrosion resistance without having to manufacture the whole apparatus in a corrosion resistant material. Also in other connections the coating material according to the invention may be used to obtain a more wear resistant/more corrosion resistant surface in equipment manufactured of a cheaper or more easily workable material.

The coating material according to the invention may also be used for coating of products where the composition of the binding phase closely corresponds to the composition of the material in the product.

The invention claimed is:

1. An iron based material for coating surfaces, comprising a binding phase in the form of a corrosion dense alloy which contains at least 50% Fe, 12-30% Cr, 6-40% Ni, 0-7% Mo, 0-1% N, 6-20% Si, and Mn being present in an amount not greater than 5%, all percentages stated as weight percent, which Si-addition lowers the liquidus temperature, that is the temperature at which the binding phase is completely melted, to a value below 1250° C., and the material also comprises hard particles based on one or a mixture of two or more oxides, nitrides, carbides, and borides, or one or a mixture of two or more of oxygen, carbon, nitrogen, and boron, added to the material in such amounts that the formation of one or a mixture of two or more oxides, carbides, nitrides, and borides is formed.

2. An iron based material for coating surfaces, comprising a binding phase in the form of a corrosion dense alloy which contains at least 50% Fe, 12-30% Cr, 6-20% Ni, 0-7% Mo, 0-1% N, 6-20% Si; and Mn being present in an amount not greater than 5%, all percentages stated as weight percent, which Si-addition lowers the liquidus temperature, that is the temperature at which the binding phase is completely melted, to a value below 1250° C., and the material also comprises hard particles based on one or a mixture of two or more oxides, nitrides, carbides, and borides, or one or a mixture of two or more of oxygen, carbon, nitrogen, and boron, added to the material in such amounts that the formation of one or a mixture of two or more oxides, carbides, nitrides, and bondes is formed.

3. An iron based material according to claim 1, wherein the binding phase apart from Si also contains one or a mixture of two or more of B, P, Hf, and C, which elements also lower the liquidus temperature, at which the amount of B is 0-1.5%, while the amount of P is 0-15% and the amount of Hf is 0-15% and the amount of C is 0-2%.

4. An iron based material according to claim 1, wherein the amount of Si in the binding phase is 7-16%.

5. An iron based material according to claim 4, wherein Si in the binding phase is 8-12%.

6. An iron based material according to claim 1, wherein the binding phase is produced by one of gas atomization of a melt, water atomization of a melt, melt spinning of a melt, or by crushing an ingot.

7. An iron based material according to claim 1, wherein the liquidus temperature is less than about 200° C.

8. An iron based material according to claim 2, wherein the binding phase apart from Si also contains one or a mixture of two or more of B, P, Hf, and C, which elements also lower the liquidus temperature, at which the amount of B is 0-1.5%, while the amount of P is 0-15% and the amount of Hf is 0-15% and the amount of C is 0-2%.

9. An iron based material according to claim 2, wherein the amount of Si in the binding phase is 7-16%.

10. An iron based material according to claim 9, wherein Si in the binding phase is 8-12%.

11. An iron based material according to claim 2, wherein the binding phase is produced by one of gas atomization of a melt, water atomization of a melt, melt spinning of a melt, or by crushing of an ingot.

12. An iron based material according to claim 2, wherein the liquidus temperature is less than about 1200° C.

13. An iron based material for coating surfaces, comprising a binding phase in the form of a corrosion dense alloy which contains at least 50% Fe, 12-30% Cr, 26-40% Ni, 0-7% Mo, 0-1% N, 6-20% Si, and Mn being present in an amount not greater than 5%, all percentages stated as weight percent, which Si-addition lowers the liquidus temperature, that is the temperature at which the binding phase is completely melted, to a value below 1250° C., and the material also comprises hard particles based on one or a mixture of two or more oxides, nitrides, carbides, and borides, or one or a mixture of two or more of oxygen, carbon, nitrogen, and boron, added to the material in such amounts that the formation of one or a mixture of two or more oxides, carbides, nitrides, and borides is formed.

* * * * *

UNITED STATES PATENT AND TRADEMARK OFFICE
CERTIFICATE OF CORRECTION

PATENT NO. : 7,285,151 B2 Page 1 of 1
APPLICATION NO. : 10/477020
DATED : October 23, 2007
INVENTOR(S) : Per Erik Sjodin and Per Olof Gunnar Dahlberg It is certified that error appears in the above-identified patent and that said Letters Patent is hereby corrected as shown below:

Claim 7
Column 4, Line 26: After "about", please delete "200°" and substitute --1200°--.

Signed and Sealed this

Twenty-fifth Day of December, 2007

JON W. DUDAS
*Director of the United States Patent and Trademark Office*